United States Patent
Nabetani et al.

(10) Patent No.: US 11,057,563 B2
(45) Date of Patent: Jul. 6, 2021

(54) IMAGE PICKUP DEVICE AND METHOD FOR CONTROLLING SAME

(71) Applicant: SHARP KABUSHIKI KAISHA, Sakai (JP)

(72) Inventors: Kaiji Nabetani, Sakai (JP); Akihiro Kodama, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/375,514

(22) Filed: Apr. 4, 2019

(65) Prior Publication Data

US 2019/0320116 A1 Oct. 17, 2019

(30) Foreign Application Priority Data

Apr. 12, 2018 (JP) .............................. JP2018-076974

(51) Int. Cl.
*H04N 5/232* (2006.01)
*H04N 5/235* (2006.01)

(52) U.S. Cl.
CPC ....... *H04N 5/23245* (2013.01); *H04N 5/2356* (2013.01); *H04N 5/23218* (2018.08)

(58) Field of Classification Search
CPC .......... H04N 5/23218; H04N 5/23229; H04N 5/23245; H04N 5/2356
See application file for complete search history.

(56) References Cited

U.S. PATENT DOCUMENTS

| 9,241,102 | B2 * | 1/2016 | Bala | ............. H04N 5/23267 |
| 2008/0129854 | A1 * | 6/2008 | Onoda | ............. H04N 1/2145 348/295 |
| 2015/0010239 | A1 | 1/2015 | He et al. | |
| 2015/0015771 | A1 * | 1/2015 | Shih | ............. H04N 5/23293 348/349 |
| 2016/0173752 | A1 * | 6/2016 | Caviedes | ........... H04N 1/00204 348/207.11 |
| 2016/0259992 | A1 * | 9/2016 | Knodt | ............. H04N 5/232941 |
| 2018/0021174 | A1 * | 1/2018 | Boncyk | ............. H04N 5/23222 463/25 |
| 2018/0249090 | A1 * | 8/2018 | Nakagawa | ........ H04N 5/23229 |
| 2018/0373934 | A1 * | 12/2018 | Bridges | ............. G06K 9/00671 |
| 2019/0035047 | A1 * | 1/2019 | Lim | ......................... G06T 1/20 |

FOREIGN PATENT DOCUMENTS

| CN | 104243787 A | 12/2014 |
| CN | 107547789 A | 1/2018 |
| JP | 2009-089220 A | 4/2009 |

OTHER PUBLICATIONS

Yi-Ling Chen et al., "Learning to Compose with Professional Photographs on the Web", MM '17 Proceedings of the 2017 ACM on Multimedia Conference pp. 37-45. https://github.com/yiling-chen/view-finding-network.

* cited by examiner

*Primary Examiner* — Amy R Hsu

(74) *Attorney, Agent, or Firm* — ScienBiziP, P.C.

(57) ABSTRACT

A smartphone includes a camera, a control section, and a storage section. The control section determines favorability of a composition of a target frame which is an arbitrary frame among a plurality of frames constituting the moving image. Then, in accordance with a result of determining the favorability of the composition of the target frame, the control section stores, in the storage section, a still image which corresponds to the target frame.

10 Claims, 9 Drawing Sheets

IMAGE PICKUP DEVICE AND METHOD FOR CONTROLLING SAME

This Nonprovisional application claims priority under 35 U.S.C. § 119 on Patent Application No. 2018-076974 filed in Japan on Apr. 12, 2018, the entire contents of which are hereby incorporated by reference.

TECHNICAL FIELD

An aspect of the present invention relates to an image pickup device capable of capturing a still image and a moving image.

BACKGROUND ART

Various ideas for image pickup devices have been proposed so as to improve convenience of users. For example, Patent Literature 1 discloses a technique for allowing a user to obtain a better-composed still image during capturing (taking) a moving image (image). Specifically, an image pickup device disclosed in Patent Literature 1 generates a trimmed image, in which a captured image of an object is arranged in a predetermined composition, by trimming one frame of the moving image so as to obtain a partial region containing an image of the object.

CITATION LIST

Patent Literature

[Patent Literature 1] Japanese Patent Application Publication, Tokukai, No. 2009-89220

Non-patent Literature

[Non-Patent Literature 1] Yi-Ling Chen, Jan Klopp, Min Sun. Shao-Yi. Chien, Kwan-Liu Ma, "Learning to Compose with Professional Photographs on the Web", MM '17 Proceedings of the 2017 ACM on Multimedia Conference Pages 37-45.

SUMMARY OF INVENTION

Technical Problem

An object of an aspect of the present invention is to allow a user to easily and simply obtain an aesthetically excellent still image.

Solution to Problem

In order to achieve the above object, an image pickup device in accordance with an aspect of the present invention includes: an image pickup section capable of capturing a still image and a moving image; a control device configured to control the image pickup section; and a storage section, the control device (i) determining favorability of a composition of a target frame which is an arbitrary frame among a plurality of frames constituting the moving image, and in accordance with a result of determining the favorability of the composition of the target frame, storing the still image in the storage section, the still image corresponding to the target frame.

In order to achieve the above object, a method for controlling an image pickup device in accordance with an aspect of the present invention is a method for controlling an image pickup device, the image pickup device including an image pickup section capable of capturing a still image and a moving image, and a storage section, the method comprising the steps of: (i) determining favorability of a composition of a target frame which is an arbitrary frame among a plurality of frames constituting the moving image; and (ii) in accordance with a result of determining the favorability of the composition of the target frame, storing the still image in the storage section, the still image corresponding to the target frame.

Advantageous Effects of Invention

An image pickup device in accordance with an aspect of the present invention allows a user to easily and simply obtain an aesthetically excellent still image. Further, a method for controlling the image pickup device in accordance with an aspect of the present invention produces a similar effect.

DESCRIPTION OF EMBODIMENTS

Embodiment 1

Figure 1:
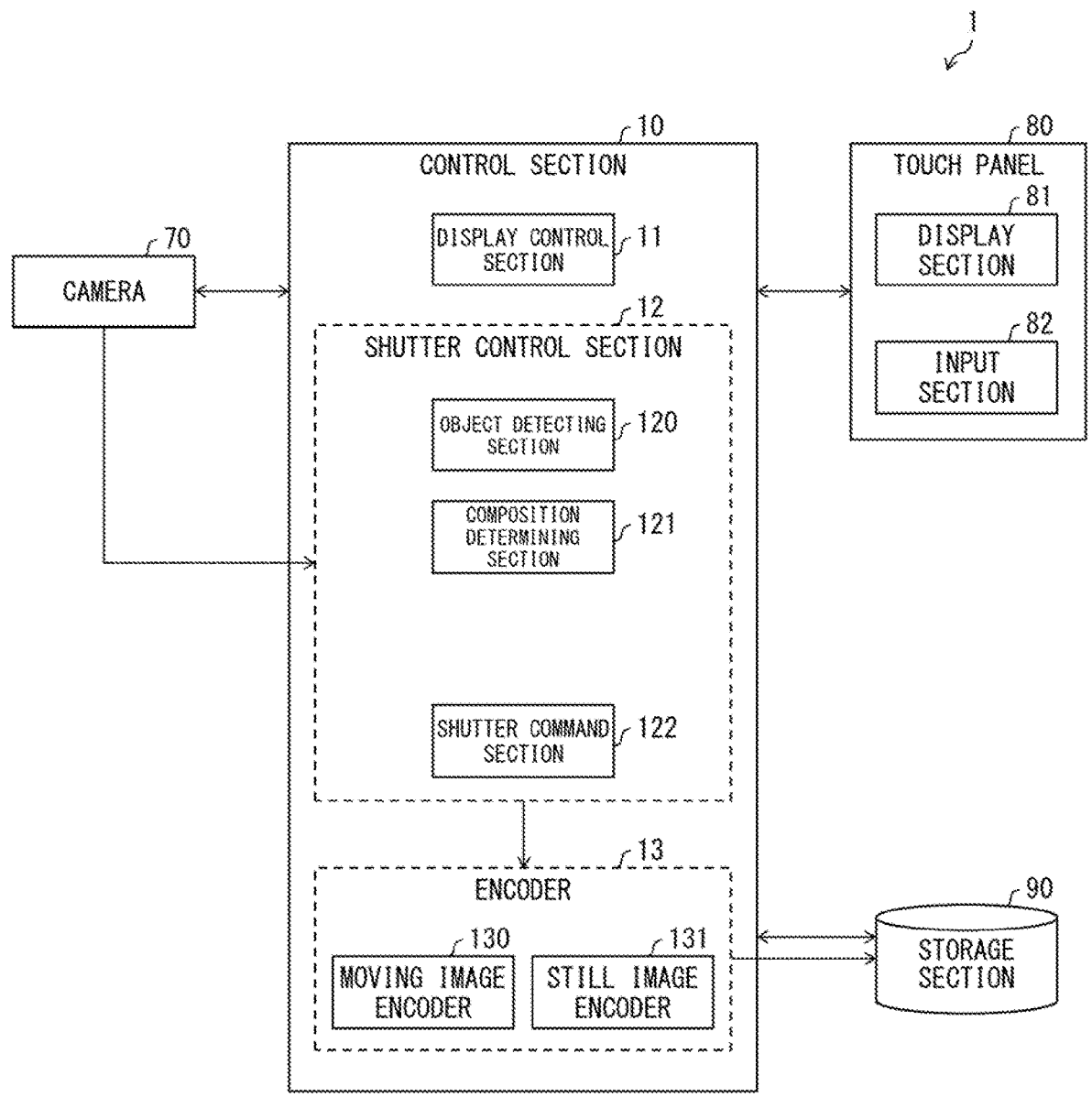
FIG. 1 is a functional block diagram illustrating a main part configuration of a smartphone in accordance with Embodiment 1.

The following will discuss a smartphone 1 (image pickup device) in accordance with Embodiment 1. For convenience of explanation, in Embodiments other than. Embodiment 1, identical reference numerals are given to members which have respective functions identical with those described below in Embodiment 1, and descriptions of the respective members will not be repeated.

Embodiment 1 describes a smartphone 1 (mobile information processing terminal) having a camera function, as an example of an image pickup device in accordance with an aspect of the present invention. Note however that the image pickup device is not limited to such an information processing terminal, and can be a digital camera which can be carried around by a user. The image pickup device can alternatively be a monitoring camera which is fixedly provided at a predetermined position.

(Overview of smartphone 1)

FIG. 1 is a functional block diagram illustrating a main part configuration of the smartphone 1. The smartphone 1 includes a control section 10 (control device), a camera 70 (image pickup section), a touch panel 80, and a storage section 90. Though FIG. 1 illustrates, as an example, a case where one control section 10 and one storage section 90 are provided, the number of control sections 10 and the number of storage section 90 can be more than one. The same is true for the number of camera(s) 70 and the number of touch panel(s) 80 (more specifically, each of the number of display section(s) 81 and the number of input section(s) 82).

The control section 10 carries out overall control of each section of the smartphone 1. Particularly, the control section 10 controls an operation of the camera 70. The storage section 90 can be a storage medium (removable medium) which is attachable to/detachable from the smartphone 1. Alternatively, the storage section 90 can be a built-in storage medium (hard disk drive) which has been fabricated in the smartphone 1 in advance.

The camera 70 is, for example, a well-known camera module. The camera 70 includes a well-known image pickup element. Further, the camera 70 is capable of capturing a still image and a moving image. Note that in a case where a plurality of (e.g., two) cameras 70 are provided, some (e.g., one) of cameras can be used as cameras (a camera) for capturing a still image, and the others (e.g., the other one) of the cameras can be used as cameras (a camera) for capturing a moving image.

The touch panel 80 is a member including the display section 81 and the input section 82 which are integrated with each other. Note however that the display section 81 and the input section 82 can be each provided as a separate member. For example, the input section 82 can be a hardware key(s) of the smartphone 1. The input section 82 accepts an operation of a user (hereinafter, referred to as a user operation). For example, a user activates the camera 70 by pressing a button (icon) of a camera application, which button is displayed on the touch panel 80. The control section 10 causes the camera 70 to operate in response to that user operation.

The display section 81 functions as an electronic finder. The display section 81 displays, as a viewing screen, a composition which a lens of the camera 70 is capturing (more specifically, current frame of a moving image being captured by the camera 70 in real time) (e.g., FIG. 6 described later). In an image capture mode (e.g., manual image capture mode), a user presses a shutter button (a button for instructing the camera 70 to perform a shutter operation) which is displayed on the touch panel 80, while viewing the viewing screen. Triggered by a press on the shutter button, the control section 10 causes the camera 70 to perform the shutter operation. Note that the shutter operation is also referred to as a release operation. Similarly, the shutter button is also referred to as a release button.

The shutter operation means an operation which is performed for capturing a still image by the camera 70 so as to cause the smartphone 1 to capture the still image. More specifically, the shutter operation means a process for causing a shutter (electronic shutter) of the camera 70 to operate, so as to allow the smartphone 1 to capture a still image. The shutter operation includes performing an exposure adjustment process (electronic shutter process) for the image pickup element of the camera 70. In this way, a user can capture a still image at a desired time by a manual operation.

In addition, the smartphone 1 has a plurality of image capture modes (image pickup modes), which includes an image capture mode (hereinafter, referred to as a special mode) for causing the camera 70 to automatically perform the shutter operation under a predetermined condition. Embodiment 1 describes, as an example, a case where the special mode is an image capture mode in which while a moving image is being captured, the camera 70 is caused to automatically (selectively) perform the shutter operation. The expression "while a moving image is being captured" can be rephrased as "in a period during which a process for storing a moving image in the storage section 90 is being carried out by the control section 10".

As described below, the special mode can cause the camera 70 to selectively perform the shutter operation in accordance with a result of a determination process utilizing an artificial intelligence (AI) technology. Accordingly, the special mode is also referred to as, for example, an "AI AUTO mode". More specifically, the special mode can cause the camera 70 to perform the shutter operation so as to capture a still image corresponding to a target frame (described later). The following will discuss, as an example, a case where the smartphone 1 is operating in the special mode. Note that an image capture mode of the smartphone 1 can be switched to another image capture mode, in response to a user operation.

The special mode can also be expressed as an "image capture mode in which a still image corresponding to a target frame is selectively stored in the storage section 90". Therefore, it is possible to rephrase the expression "causing the camera 70 to perform the shutter operation" below as "causing the control section 10 to store, in the storage section 90, a still image corresponding to a target frame".

(Control section 10)

The control section 10 includes a display control section 11, a shutter control section 12, and an encoder 13. Particularly, the display control section 11 controls an operation of the display section 81. The display control section 11 controls, for example, display of a viewing screen. The encoder 13 includes a moving image encoder 130 and a still image encoder 131. An example of an operation of the encoder 13 will be described later. The shutter control section 12 includes an object detecting section 120, a composition determining section 121, and a shutter command section 122. The shutter control section 12 causes the camera 70 to selectively perform the shutter operation in the special mode.

Figure 2:
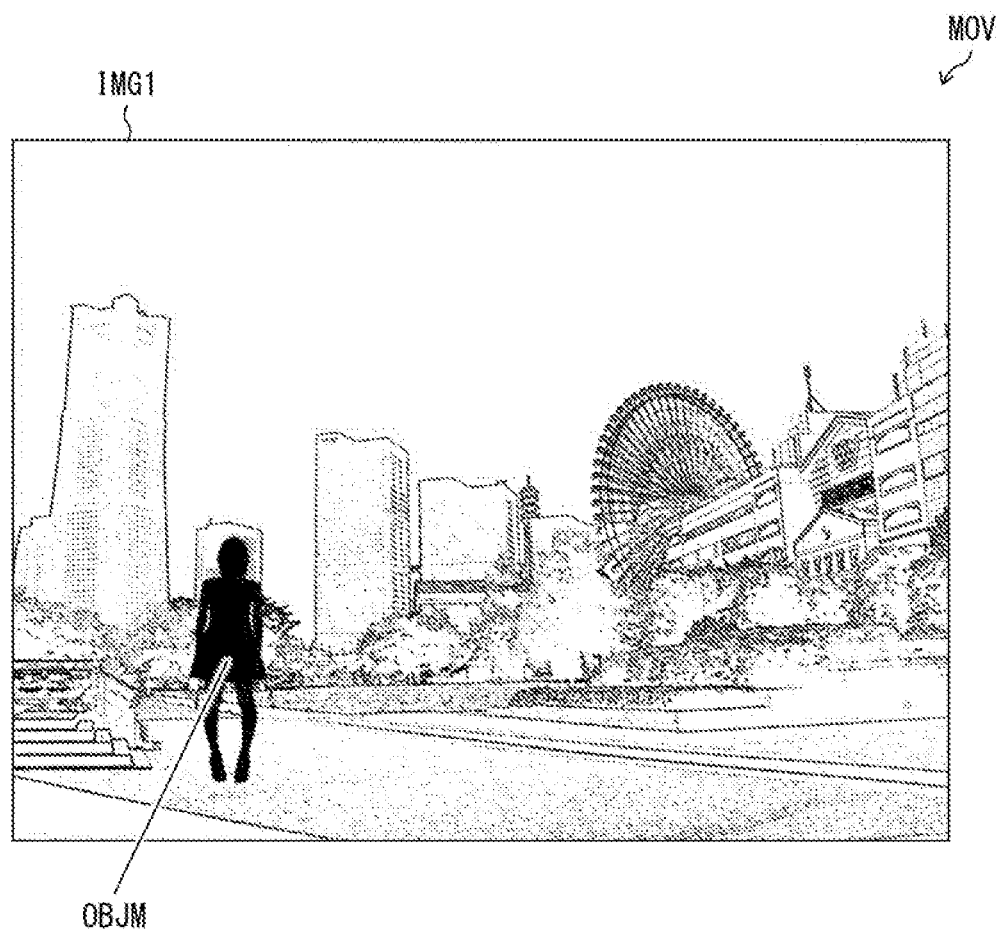
FIG. 2 is a diagram for explaining an operation example of the smartphone illustrated in FIG. 1, in a special mode.
Figure 3:
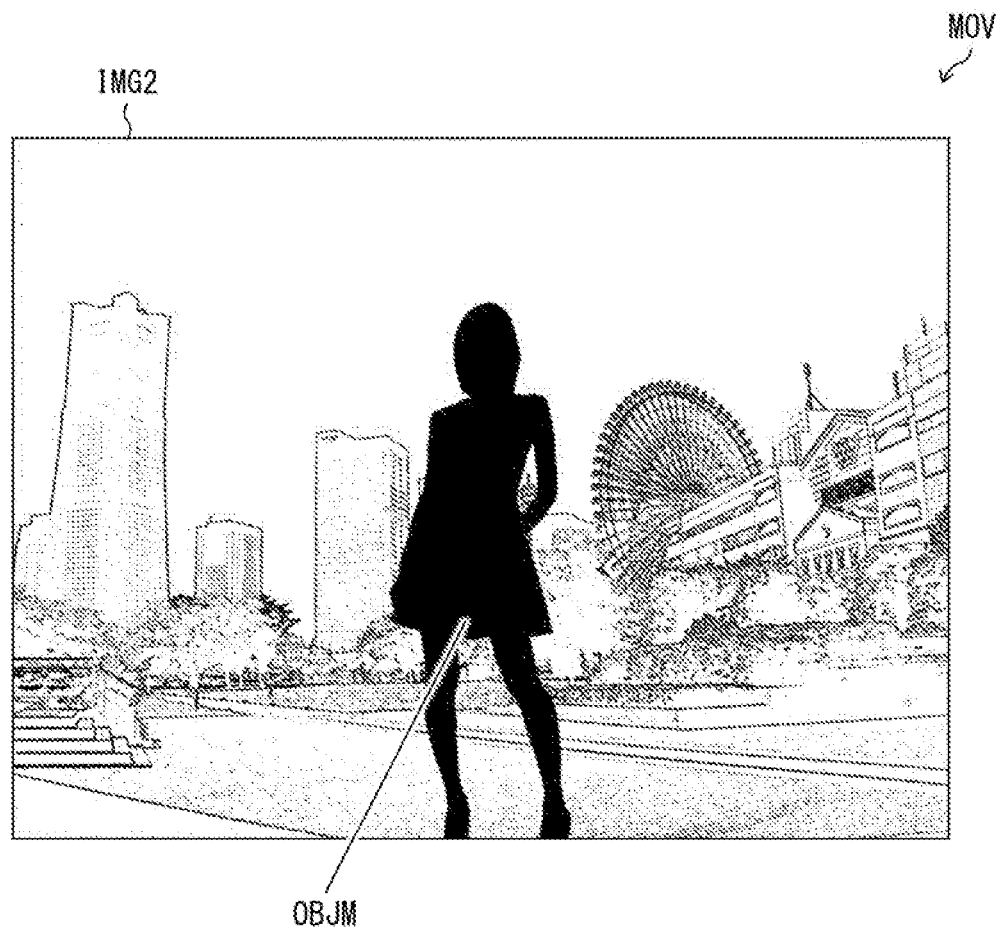
FIG. 3 is a diagram for explaining anther operation example of the smartphone illustrated in FIG. 1, in the special mode.
Figure 4:
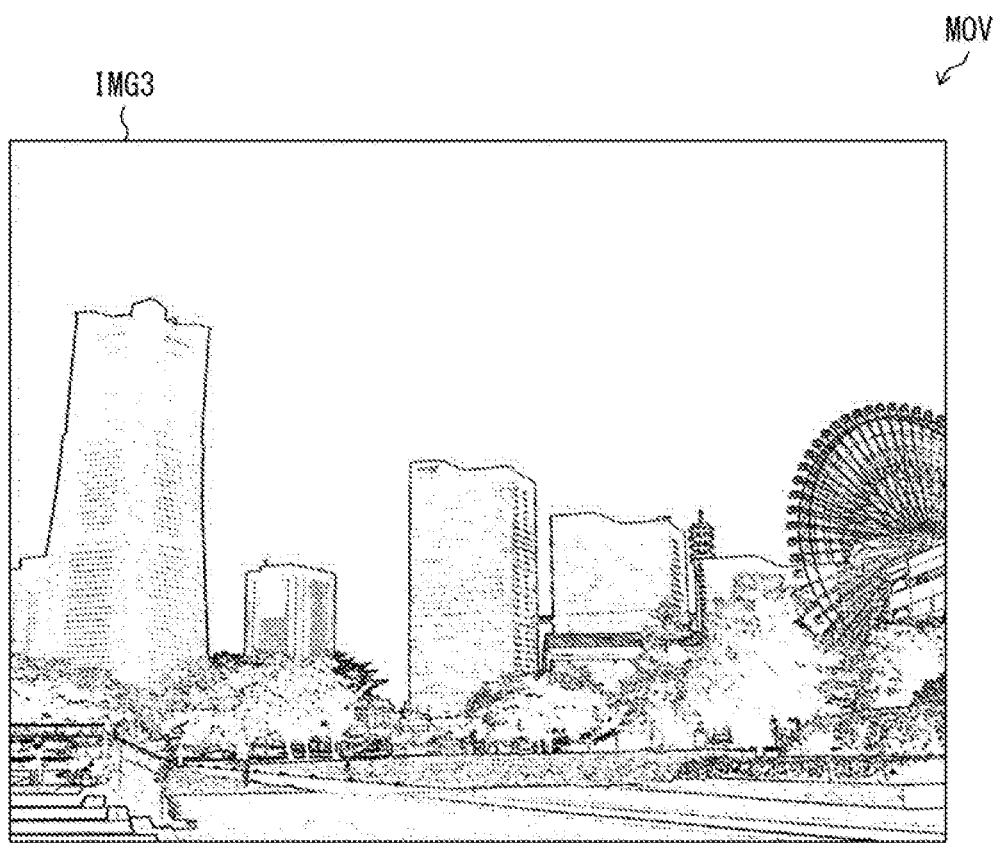
FIG. 4 is a diagram for explaining still another operation example of the smartphone illustrated in FIG. 1, in the special mode.

FIGS. 2 to 4 are each a diagram for explaining an operation of the smartphone 1 in the special mode. A moving image which the camera 70 is capturing in real time in the special mode is hereinafter referred to as an MOV. Further, a period during which the smartphone 1 is capturing an MOV is referred to as an image capture period. A top-to-bottom direction (vertical direction) and a left-to-right direction (horizontal direction) of an MOV are specified in advance.

An MOV is made of a plurality of frames. FIGS. 2 to 4 show images IMG1 to IMG3, respectively, and each of these IMG1 to IMG3 is an arbitrary frame among a plurality of frames constituting an MOV. That is, these IMG1 to IMG3 are each a still image. For an example, the IMG2 is a frame following the IMG1, and the IMG3 is a frame following the IMG2.

For convenience, an arbitrary frame of an MOV is hereinafter referred to as a still image A. The IM to IMG3 are each an example of the still image A. As described below, the still image A corresponds to a frame to be analyzed by the shutter control section 12 (more specifically, the object detecting section 120 and the composition determining section 121). Accordingly, the still image A (IMG1 to IMG3) is also referred to as a target frame.

In the MOV (i.e., still images A), images of a plurality of objects are presented. For example, the IMG1 to IMG3 each contain images of objects such as a road, a Ferris wheel, buildings, etc. In addition, the IMG1 and the IMG2 each contain an image of a person (hereinafter, referred to as an OBJM).

The following assumes, as an example, a case where a user is intended to have an OBJM as a main object whose image is to be captured (object). In other words, the following assumes, as an example, a case where a user wants to obtain a still image in which the OBJM is presented in a suitable composition. In light of this, the OBJM is also referred to as a main object.

Embodiment 1 describes, as an example, a case where the OBJM is a person. Note that the OBJM can be any one predetermined object among a plurality of objects presented in a still image. The OBJM should be an object of a kind which a user may often select as a main object. For example, the OBJM can be an animal (living body) such as a dog or a cat. Alternatively, the OBJM can be a non-living object. The non-living object can be a movable object (e.g., a train) or a stationary object (e.g., a construction). In the smartphone 1, information (object category) indicative of a kind of an object as a main object is set in advance. Note that a portion of a living body can also be set as the OBJM. For example, a human face can be set as the OBJM.

The object detecting section 120 detects an image of an OBJM which may be contained in each frame still image A) of an MOV. Specifically, the object detecting section 120 determines whether or not the image of the OBJM is contained in the still image A. Note that for simplicity, the "image of the OBJM" is hereinafter also referred to as simply the "OBJM". The other objects are each also referred to by a simple term in a similar manner.

For example, the object detecting section 120 can detect (specify) each object by using a well-known AI technology. It is possible to use a deep learning technique in an object detecting method (method for specifying an object category) in the object detecting section 120. In this case, the object detecting section 120 is caused to perform machine learning in advance by using images (reference images) of a plurality of objects. Then, it is possible to allow the object detecting section 120 to obtain a model for identifying each object (specifying an object category). The model is hereinafter referred to as a first learned model (object specifying model).

The object detecting section 120 detects a plurality of objects which are contained in the still image A. Then, the object detecting section 120 specifies an object category of each of the objects, by comparing each of the plurality of objects with the first learned model. That is, the object detecting section 120 can identify whether any of the plurality of objects is an OBJM (person). Use of the deep learning technique makes it possible to highly accurately identify an object (detect an OBJM).

The object detecting section 120 then generates information (object detection result information) indicative of a result of determination as to whether or not the still image A contains an OBJM. In a case where the object detecting section 120 detects an image of an OBJM in a still image A, the object detecting section 120 further detects the position and the size of the image of the OBJM in the still image A. Here, in a case where the object detecting section 120 detects an image of an OBJM in a still image A, the object detecting section 120 generates object detection result information (first object detection result information) indicating that the image of the OBJM is detected. The first object detection result information includes information indicative of the position and the size of the image of the OBJM in the still image A. In contrast, in a case where the object detecting section 120 determines that no image of an OBJM is contained in the still image A, the object detecting section 120 generates object detection result information (second object detection result information) indicating that no image of an OBJM is contained.

The composition determining section 121 determines how well each frame (e.g., still image A) of an MOV is composed (hereinafter, also referred to as favorability of a composition of each frame) (more specifically, an aesthetic quality of each frame). For example, the composition determining section 121 calculates a composition score of the still image A (hereinafter, also referred to as score of composition, or SC). The composition score is an index indicative of the favorability of a composition of a still image A (target frame as a still image). In other words, the composition score indicates the favorability of a composition of a target frame in a case where the target frame is regarded as a still image. The favorability of the composition of the still image A can be quantitatively evaluated by the composition score. Examples of the SC include integers of not less than 0 to not more than 100. The higher the SC, the higher the favorability of the composition of the still image A is. Note that in a case where the still image A contains an OBJM, the SC depends on the size and the position of the OBJM in the still image A.

Embodiment 1 describes, as an example, a case where the smartphone 1 (control section 10) uses the SC as a result of determining the favorability of a composition of a still image A (target frame). Note however that the composition determining section 121 only needs to be capable of determining the favorability of the composition of the still image A. The composition determining section 121 need not necessarily calculate the SC. Note that calculating the SC by the composition determining section 121 is merely one example of a process for determining the favorability of the composition of the still image A.

The deep learning technique can be used also for a method for calculating the SC (a method for determining whether or not a composition is favorable) by the composition determining section 121. The composition determining section 121 can be realized by use of a technique disclosed in, for example, Non-Patent Literature 1. The composition determining section 121 contains a model for calculating the SC, which model has been obtained as a result of machine learning. Hereinafter, this model is referred to as a second learned model (model for evaluating a composition). The composition determining section 121 compares the still image A with the second learned model. Then, the composition determining section 121 calculates the SC of the still image A as a result of the above comparison. Use of the deep learning technique makes it possible to highly accurately determine whether or not the composition of the still image A is favorable.

Note that a still image whose composition is favorable (well-composed still image) is, for example, a still image having at least one of the following Characteristics 1 to 3:

(Characteristic 1) at least either hue or brightness is appropriate;

(Characteristic 2) less blurring (preferably, no burring) occurs; and (Characteristic 3) the layout of each object does not largely differ from a well-known proper layout (central composition, composition following rule of seconds or rule of thirds, symmetrical composition, or the like).

In many cases, a still image taken by a photographer who is skillful in taking an image (e.g., professional photographer or semiprofessional photographer) is expected to satisfy at least one of the above Characteristics 1 to 3 (preferably, all of the above Characteristics 1 to 3). Accordingly, such a still image taken by a photographer can be used as learning data for deep learning in the composition determining section 121.

In view of the above points, the composition determining section 121 can determine the favorability of the composition (e.g., calculate the SC) of the still image A, on the basis of at least one of the following Criteria 1 to 3:

(Criterion 1) at least either hue or brightness in the still image A;

(Criterion 2) a degree of blurring in the still image A; and (Criterion 3) a positional relation of respective images of two or more objects contained in the still image A. The above Criteria 1 to 3 correspond to the above Characteristics 1 to 3 (criteria for determining the favorability of a composition), respectively. This makes it possible to more appropriately determine the favorability of the composition of the still image A in the composition determining section 121. For example, the composition determining section 121 may determine the favorability of the composition of the still image A on the basis of all the Criteria 1 to 3.

The shutter command section 122 gives the camera. 70 a signal which instructs the camera 70 to perform the shutter operation (shutter command signal). More specifically, the shutter command section 122 supplies a shutter command signal to the camera 70, in accordance with (i) a result of determination by the object detecting section 120 (result of detecting an image of an OBJM) and a result of determination by the composition determining section 121 (e.g.: the value of SC). In this way, the shutter command section 122 causes the camera 70 to selectively perform the shutter operation.

For example, the shutter command section 122 supplies no shutter command signal to the camera 70 (i.e., does not cause the camera 70 to perform the shutter operation), in a case where no OBJM is located in a predetermined area in a still image A. Preferably, the predetermined area is, for example, an area in the center (hereinafter, referred to as a central area) of the still image A in a case where each frame (e.g., still image A) of an MOV is equally divided into thirds horizontally. This is because in a case where a user wants to capture an image of an OBJM in a suitable composition, the composition of the still image A is often configured such that the OBJM is located in a central area. This is intended to emphasize the presence of the OBJM.

Embodiment 1 describes, as an example, a case where the predetermined area is the central area. Note however that the predetermined area can be, for example, a leftmost area in a case where the still image A is equally divided into thirds horizontally. Alternatively, the predetermined area can be, for example, a rightmost area in a case where the still image A is equally divided into thirds horizontally.

In addition, the shutter command section 122 does not supply any shutter command signal to the camera 70, in a case where the size (e.g., area) of the OBJM in the still image A is smaller than a predetermined size (size threshold). This is because in a case where a user wants to capture an image of the OBJM in a suitable composition, the composition of the still image A is often configured such that the OBJM is presented in a size larger than a certain level. This is intended to emphasize the presence of the OBJM.

Hereinafter, the term "main object-based image capture permitting condition" is used to refer to a condition in which "(i) an OBJM is located in a predetermined area in a still image A and (ii) the size of the OBJM in the still image A is not less than the size threshold". The main object-based image capture permitting condition is a condition concerning the OBJM. In a case where the main object-based image capture permitting condition is satisfied, it is expected that the presence of the OBJM is sufficiently emphasized in the still image A.

On the other hand, in a case where the main object-based image capture permitting condition is not satisfied, it is considered that the presence of the OBJM is not sufficiently emphasized in the still image A. Accordingly, in a case where a still image (e.g., IMG1 and IMG2) containing the OBJM is to be captured, the shutter command section 122 does not supply any shutter command signal to the camera 70 in a state in which the main object-based image capture permitting condition is not satisfied. This is because the still image A in such a state is not good enough as a still image which presents the OBJM.

Also, in a case where the SC of the still image A is smaller than the predetermined threshold (hereinafter, also referred to as a score threshold), the shutter command section 122 does not supply any shutter command signal to the camera 70. That is, in a case where a result of determining the favorability of a composition is lower than a predetermined level, the shutter command section 122 does not supply any shutter command signal to the camera 70. The following example assumes a case where the score threshold (THS) is 75. Hereinafter, the condition "SC THS" is referred to as a composition-based image capture permitting condition. Satisfaction of the composition-based image capture permitting condition means that a result of determining the favorability of a composition is not less than the predetermined level. In Embodiment 1, the composition-based image capture permitting condition is a condition concerning the SC. In a case where a still image containing an OBJM is to be captured, the shutter command section 122 does not supply any shutter command signal to the camera 70 unless the composition-based image capture permitting condition is satisfied. That is, even in a case where the main object-based image capture permitting condition is satisfied, the shutter command section 122 does not supply any shutter command signal to the camera 70 unless the composition-based image capture permitting condition is satisfied.

Assume here, as an example, a case where the object detecting section 120 carries out object detection on the IMG of FIG. 2. In the example of FIG. 2, an OBJM is located in a leftmost area of the IMG1. In other words, the OBJM is not located in a central area of the IMG1. That is, the main object-based image capture permitting condition is not satisfied. Accordingly, the shutter command section 122 does not supply any shutter command signal to the camera 70.

Further, assume a case where the OBJM is located in the central area in FIG. 2. In FIG. 2, the size of the OBJM is sufficiently small relative to a whole size of the IMG1 (e.g., an area of the IMG1). In other words, the size of the OBJM is smaller than the size threshold. In this case, as with the above case, the main object-based image capture permitting condition is not satisfied. Accordingly, the shutter command section 122 does not supply any shutter command signal to the camera 70. In this way, in the example of FIG. 2, the shutter operation is not performed regardless of the SC.

Note that as a result of calculating the SC of the IMG1 by the composition determining section 121, SC=70. Therefore, in the example of FIG. 2, the composition-based image capture permitting condition is also unsatisfied.

Next, assume, as another example, a case where the object detecting section 120 carries out object detection on the IMG2 of FIG. 3. In the example of FIG. 3, the OBJM is located in a central area of the IMG2. In addition, the size of the OBJM is larger than a certain level as compared to a whole size of the IMG2 (e.g., an area of the IMG2). In other words, the size of the OBJM is not less than the size threshold. Accordingey, the main object-based image capture permitting condition is satisfied in the case of the IMG2.

Further, as a result of calculating the SC of the IMG2 by the composition determining section 121, SC=80. In this manner, in the example of FIG. 3, the composition-based image capture permitting condition is also satisfied. In this case, the shutter command section 122 supplies a shutter command signal to the camera 70. As described above, in a case where a still image containing an OBJM is to be captured (in a case where the object detecting section 120 detects an OBJM), the shutter command section 122 causes the camera 70 to perform the shutter operation only in a case where both of the main object-based image capture permitting condition and the composition-based image capture permitting condition are satisfied.

Consequently, the smartphone 1 can capture the IMG2 as a still image. Note however that precisely, a still image which is exactly the same as the IMG2 (target frame) may not be captured due to influence of, for example, a time lag between the object detection and the shutter operation. More precisely, the smartphone 1 captures a still image corresponding to the IMG2. This point is also true for the IMG3 etc. which will be described below.

The expression "a still image corresponding to a target frame e.g., IMG2)" means a still image which is captured as a result of image capturing by the camera 70 in a case where a shutter command signal is supplied to the camera 70 as a result of determination on the target frame. A still image corresponding to a certain target frame is presented in a composition substantially identical (ideally perfectly identical) to that of the certain target frame. Accordingly, a composition of the still image corresponding to the certain target frame does not lose substantial identity with an overall composition of the target frame.

For convenience, in the description of the present specification, a "still image corresponding to a target frame" is assumed to be identical to a still image of the "target frame". Therefore, in some descriptions, a "target frame (still image A)" means a "still image corresponding to the target frame".

Assume, as still another example, a case where the object detecting section 120 carries out object detection on the IMG3 of FIG. 4. The IMG3 contains no OBJM. In other words, the IMG3 is an image in which only scenery is presented. In this case, the shutter command section 122 supplies a shutter command signal to the camera 70, only on the basis of the composition-based image capture permitting condition.

Specifically, in a case where a still image which contains no OBJM is to be captured (in a case where no OBJM is detected by the object detecting section 120), the shutter command section 122 causes the camera 70 to perform the shutter operation in a case where the composition-based image capture permitting condition is satisfied. It can be said that a still image having a high SC is aesthetically excellent though no OBJM is presented. Providing such a still image (e.g., aesthetically excellent still image of scenery) to a user is also beneficial for the user. As a result of calculating the SC of the IMG3 by the composition determining section 121, SC=75. In the example of FIG. 4, the shutter operation is performed since the composition-based image capture permitting condition is satisfied.

(Flow of process in special mode in smartphone 1)

Figure 5:
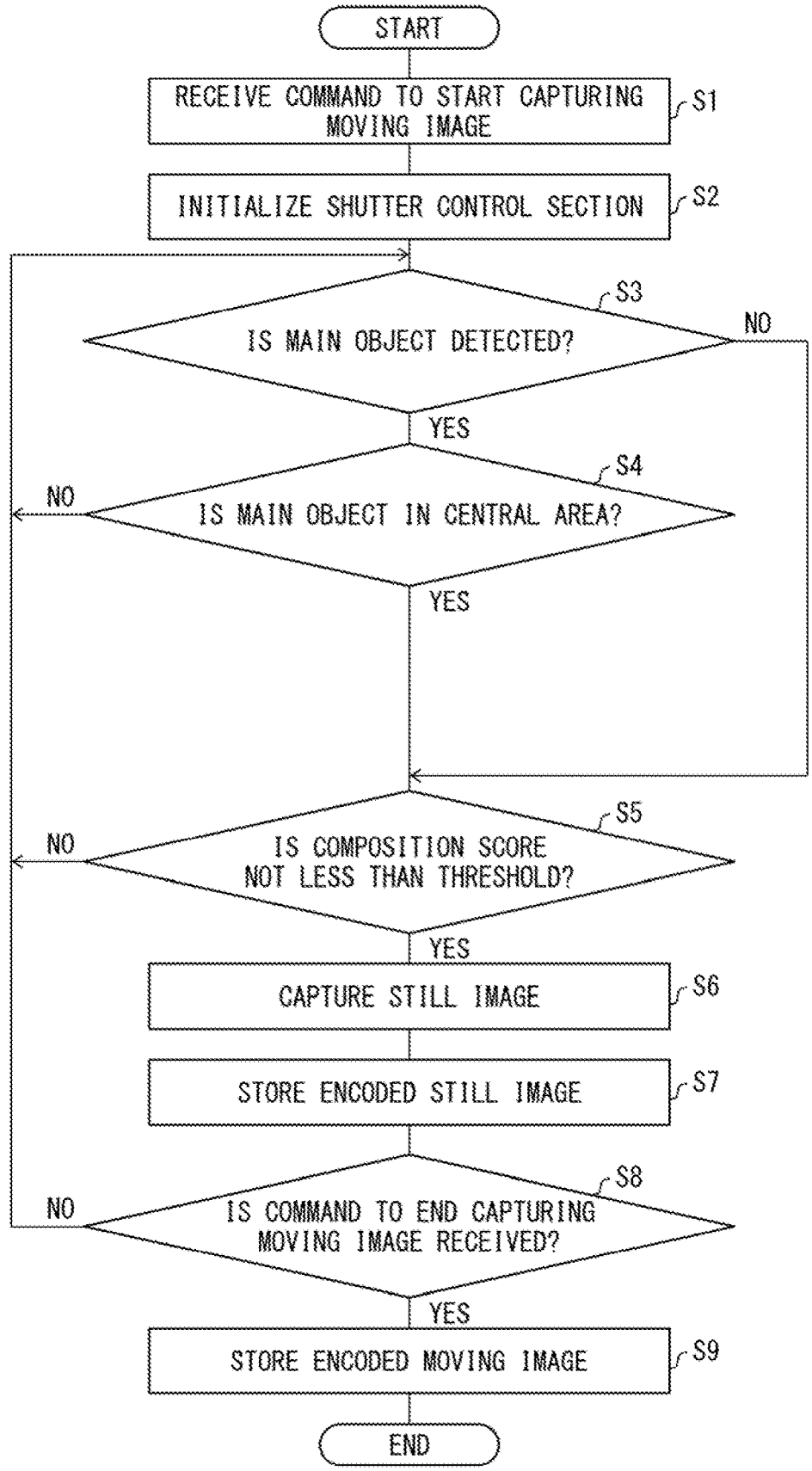
FIG. 5 is a chart illustrating an example of a flow of a process in the special mode in the smartphone illustrated in FIG. 1.

FIG. 5 is a flowchart showing an example of a flow of a process (S1 to S9) in the special mode in the smartphone 1. First, a user presses an image capture start button (button for instructing the camera 70 to start capturing a moving image), which start button is displayed on the touch panel 80. Triggered by such a press on the image capture start button, the control section 10 causes the camera 70 to start capturing an MOV (S1). In other words, the control section 10 starts an image capture period. Following the start of the image capture period, the control section 10 initializes the shutter control section 12 (S2).

The object detecting section 120 determines whether or not an OBJM is contained in a frame (still image A) of the MOV (S3). In a case where a still image A contains an OBJM (YES in S3), the object detecting section 120 detects the position of the OBJM in the still image A (S4). In contrast, in a case where the still image A does not contain any OBJM (NO in S3), the process proceeds to S5. Note that for simplicity, a description of a process for detecting the size of the OBJM is omitted in the example of FIG. 5.

In a case where the OBJM is located in the central area of the still image A (YES in S4), the process proceeds to S5. In contrast, in a case where the OBJM is not located in the central area of the still image A (NO in S4), the process returns to S3. In this way, a process step of the composition determining section 121 may be carried out after completion of the above process steps performed by the object detecting section 120. The composition determining section 121 calculates the SC of the still image A. Then, the composition determining section 121 compares the SC and the THS so as to find which one of the SC and the THS is larger (S5).

In a case where SC≥THS (YES in S5), the shutter command section 122 supplies a shutter command signal to the camera 70. In other words, the shutter command section 122 causes the camera 70 to perform the shutter operation and to thereby capture the still image A (S6). The still image encoder 131 encodes the still image A thus captured, and stores, in the storage section 90, the still image A thus encoded (S7). As a result, capturing of the still image A has completed. In contrast, in a case where SC<THS (NO in S5), the process returns to S3.

Capturing of the MOV by the camera 70 continues until the user presses an image capture end button (button for instructing the camera 70 to end capturing the moving image), which image capture end button is displayed on the touch panel 80. Triggered by such a press on the image capture end button (YES in S8), the control section 10 causes the camera 70 to end capturing the MOV. In other words, the control section 10 ends the image capture period. The moving image encoder 130 encodes the MOV thus captured, and stores, in the storage section 90, the MOV thus encoded (S9). As a result, the capturing of the MOV has completed.

Note that in a case where no press on the image capture end button is detected (NO in S8), the process step of the control section 10 returns to S3. Accordingly, process steps following S3 are carried out similarly for an arbitrary frame(s) of the MOV subsequent to the still image A, during the image capture period.

(Effects)

The smartphone 1 makes it possible to cause the camera 70 to selectively perform the shutter operation in accordance with (i) a result of determination by the object detecting section 120 with regard to a still image A and (ii) a result of determination by the composition determining section 121 with regard to the still image A. In other words, it is possible to comprehensively evaluate (determine) (i) the state of an image of an OBJM in the still image A and (ii) favorability of an overall composition of the still image A. Accordingly, the smartphone 1 can selectively capture the still image A in accordance with a result of such comprehensive determination. Specifically, in a case where an aesthetic quality of an overall composition of a still image A is positively evaluated, the smartphone 1 captures the still image A.

In this way, the smartphone 1 can automatically capture an aesthetically excellent still image A. In other words, the smartphone 1 can automatically capture the still image A without need of user's manual operation (e.g., press on the shutter button). This allows a user to easily and simply obtain an aesthetically excellent still image A.

In particular, the smartphone 1 allows a user to obtain an aesthetically excellent still image A regardless of whether or not the user is skillful in taking an image. Further, since the user need not care right timing for clicking the shutter (right timing for pressing the shutter button), the user can concentrate on taking an MOV (MOV capturing).

In addition, in the case of the smartphone 1, since a user need not press the shutter button, it is possible to prevent the position of the camera 70 from moving against user's will when the shutter button is pressed. In other words, blurring of the MOV can be prevented. Therefore, it is also possible to provide a user skillful in taking an image with an aesthetically excellent still image A. Further, a user can obtain an MOV or a still image A while handling the smartphone 1 with one hand. As described above, the smartphone 1 is suitable for improving convenience of users.

(Supplemental notes)

(1) The smartphone 1, unlike the example described in Embodiment 1, may capture a still image A in accordance with only a result of determination by the composition determining section 121 (the favorability of the composition of the still image A). That is, the process step of detecting an OBJM is not essential in the smartphone 1. On this account, the object detecting section 120 can be omitted in the smartphone 1.

Note however that in order to allow a user to obtain a more aesthetically-excellent still image, it is preferable to further take into consideration a result of detecting an image of a main object (the state of an image of an OBJM in a still image A). Therefore, it is preferable that the smartphone 1 capture a still image A in accordance with both of (i) a result of determination by the object detecting section 120 and a result of determination by the composition determining section 121, as in Embodiment 1.

(2) In an image pickup device in accordance with an aspect of the present invention, the display section 81 is not an essential constituent element. For example, in a case where the image pickup device is a monitoring camera, the image pickup device may or may not have the display section 81. In this case, the display section 81 need only be provided so as to be communicable with the image pickup device. Note however that in order to improve convenience of users, it is preferable to provide the display section 81 in the image pickup device.

(3) An image pickup device in accordance with an aspect of the present invention need not necessarily have a plurality of image capture modes. For example, in a case where the image pickup device is a monitoring camera, only the special mode may be provided as an image capture mode.

<Variation>

Figure 6:
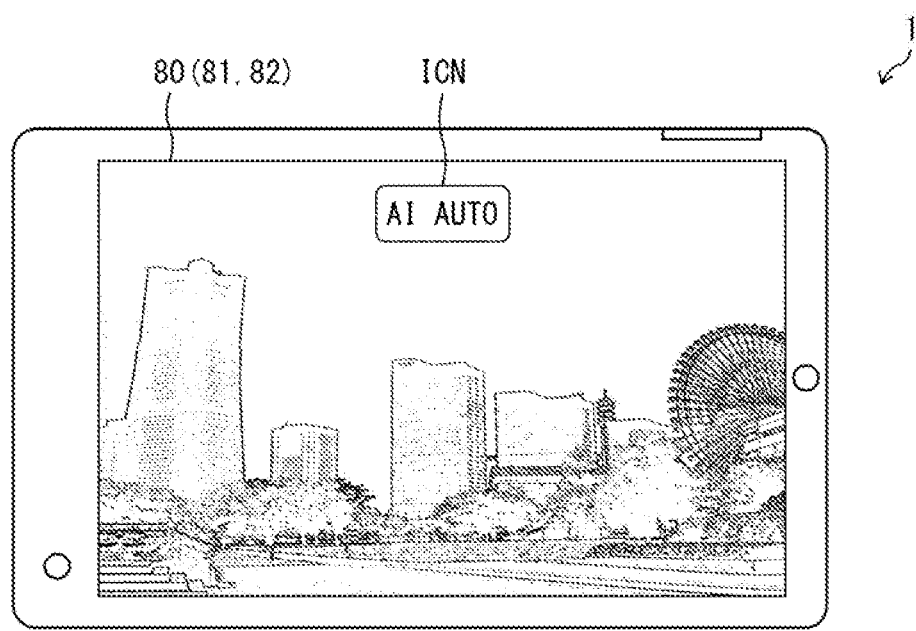
FIG. 6 is a diagram illustrating a Variation of a viewing screen of the smartphone in accordance with Embodiment 1.

FIG. 6 is a diagram illustrating an example of a viewing screen of the smartphone 1 in the special mode. The display control section 11 displays, on the touch panel 80 (viewing screen), an image (e.g., ICN in FIG. 6) indicating that the smartphone 1 is operating in the special mode.

The image only needs to be an image which indicates, for a user, that the smartphone 1 is operating in the special mode. For example, the ICN is an icon displaying letters "A1 AUTO". This configuration allows a user to visually recognize that the smartphone 1 is currently operating in the special mode.

<Variation>

A still image A may contain objects (hereinafter, referred to as main object candidates) which are each the same kind as an OBJM. Assume, for example, a case where three people (hereinafter, referred to as persons A to C) are presented in a still image A. The persons A to C are examples of the main object candidates.

In this case, the object detecting section 120 detects the position and the size of each person in the still image A. Then, the object detecting section 120 specifies (selects), as a main object (OBJM) in the still image A, one of the persons A to C, on the basis of at least one of the position and the size thus detected. This configuration makes it possible to automatically select one main object by the smartphone 1 even in a case where a still image A contains a plurality of main object candidates. This makes it possible to improve convenience of users.

Assume, for example, a case where the still image A contains the person A in a leftmost area, the person B in a central area (predetermined area), and the person C in a rightmost area. In this case, the object detecting section 120 specifies the person B (the person in the central area) as the OBJM in the still image A.

Assume, as another example, a case where all the persons A to C are in the central area in the still image A. Note however that the size of the person A is larger than those of the persons B and C in the still image A. In this case, the object detecting section 120 specifies the person A (the person who is the largest in size and located in the central area) as the OBJM in the still image A.

It is alternatively possible to let a user select one of the persons A to C as the OBJM. For example, in a case where the persons A to C are detected by the object detecting section 120, the display control section 11 additionally displays, on the touch panel 80, an image (e.g., icon or letters) indicating that the persons A to C are main object candidates. Then, the display control section 11 further displays, on the touch panel 80, an image which prompts the user to select one of the persons A to C as the OBJM.

In this case, the object detecting section 120 selects one of the persons A to C as the OBJM in response to a user operation. For example, in a case where the user touches an area corresponding to the person C on the touch panel 80, the object detecting section 120 selects the person C as the OBJM.

<Variation>

In Embodiment 1, the area of an OBJM in a still image A has been described as an example of an index indicative of the size of the OBJM (hereinafter, referred to as a size index). Note however that as the size index, it is possible to use the height (the length in a vertical direction) of the OBJM in the still image A.

Assume a case where the OBJM is a person as described above. The height of a person in a still image A is largely dependent on a body shape (body height) of the person. On the other hand, in many cases, the width (the length in a horizontal direction) of a person in a still image A is less dependent on a body shape of the person than the height of the person. Further, the height of a person in a still image A is also dependent largely on a composition (sense of perspective) in a case where the person is set as an object whose image is to be taken.

On this account, the height of a person in a still image A is one suitable example of the size in the main object-based image capture permitting condition. This is because, in view of the fact that the OBJM is a main object, it is often preferable that the size index be highly dependent on the body shape and the composition.

Assume, as an example, a case where the height of an OBJM (person) is used as the size index. In this case, the size threshold can be set to not less than ⅔ of the height of a still image A. In a case where the OBJM is present over a range of not less than ⅔ of a still image A in a height direction of the still image A, it is expected that the presence of the OBJM is sufficiently emphasized in the still image A. Note however that the size threshold is merely one example.

It is possible to use, as the size index, the width of the OBJM in the still image A. The size index can be selected as appropriate in accordance with, for example, the kind and the composition of the OBJM.

<Variation>

Assume, as an example, a case where a still image A (e.g., IMG2) in which an OBJM is emphatically presented is to be captured. The following example supposes that the composition of a background stays substantially the same in an aesthetically excellent state. Assume a case where in the above state, the OBJM maintains a predetermined posture for a long time during an MOV capture period.

In this case, the main object-based image capture permitting condition and the composition-based image capture permitting condition are kept satisfied for a long time. Accordingly, still images A whose compositions are similar to each other are repeatedly and automatically captured by respective shutter operations as time passes. The second and subsequent ones of these still images A are less valuable than the first one of the still images A.

Hereinafter, the term "state having a small SC change" is used to refer to a state in which "a change in SC stays within a predetermined range over not less than a predetermined time period". In light of the above, it is preferable that the composition determining section 121 determine whether or not the state having a small SC change is occurring.

In a case where the state having a small SC change is detected, the shutter command section 122 does not cause the camera 70 to perform the shutter operation even in a case where the main object-based image capture permitting condition and the composition-based image capture permitting condition are satisfied. This configuration makes it possible to prevent capturing of two or more still images A whose compositions are similar to each other. In addition, the configuration also makes it possible to reduce the power consumption of the camera 70.

Assume, as another example, a case where a still image A (e.g., IMG3) in which no OBJM is presented is to be captured. In this case, it is preferable to prevent capturing of two or more still images A whose compositions are similar to each other as in the case described above. In light of this, in a case where the state having a small SC change is detected, the shutter command section 122 does not cause the camera 70 to perform the shutter operation even in a case where the composition-based image capture permitting condition is satisfied.

<Variation>

The special mode need not necessarily be applied only in capturing a moving image. In other words, the special mode need not necessarily be included as a moving image capture mode. The special mode may be applied in capturing a still image. That is, the special mode may be included as a still image capture mode.

For example, in the still image capture mode, the display control section 11 causes the touch panel 80 to display in real time a through-the-lens image similar to an MOV (through-the-lens image corresponding to the MOV) as a candidate of a still image to be captured. The smartphone 1 can cause the camera 70 to selectively perform the shutter operation by carrying out a process similar to that in Embodiment 1, in a period during which the through-the-lens image is being displayed on the touch panel 80.

As described above, the special mode only needs to be an image capture mode in which the camera 70 is caused to selectively perform the shutter operation in (i) a period during which an MOV is being captured or (ii) a period during which a through-the-lens image corresponding to the MOV is being displayed on the touch panel 80.

Embodiment 2

Figure 7:
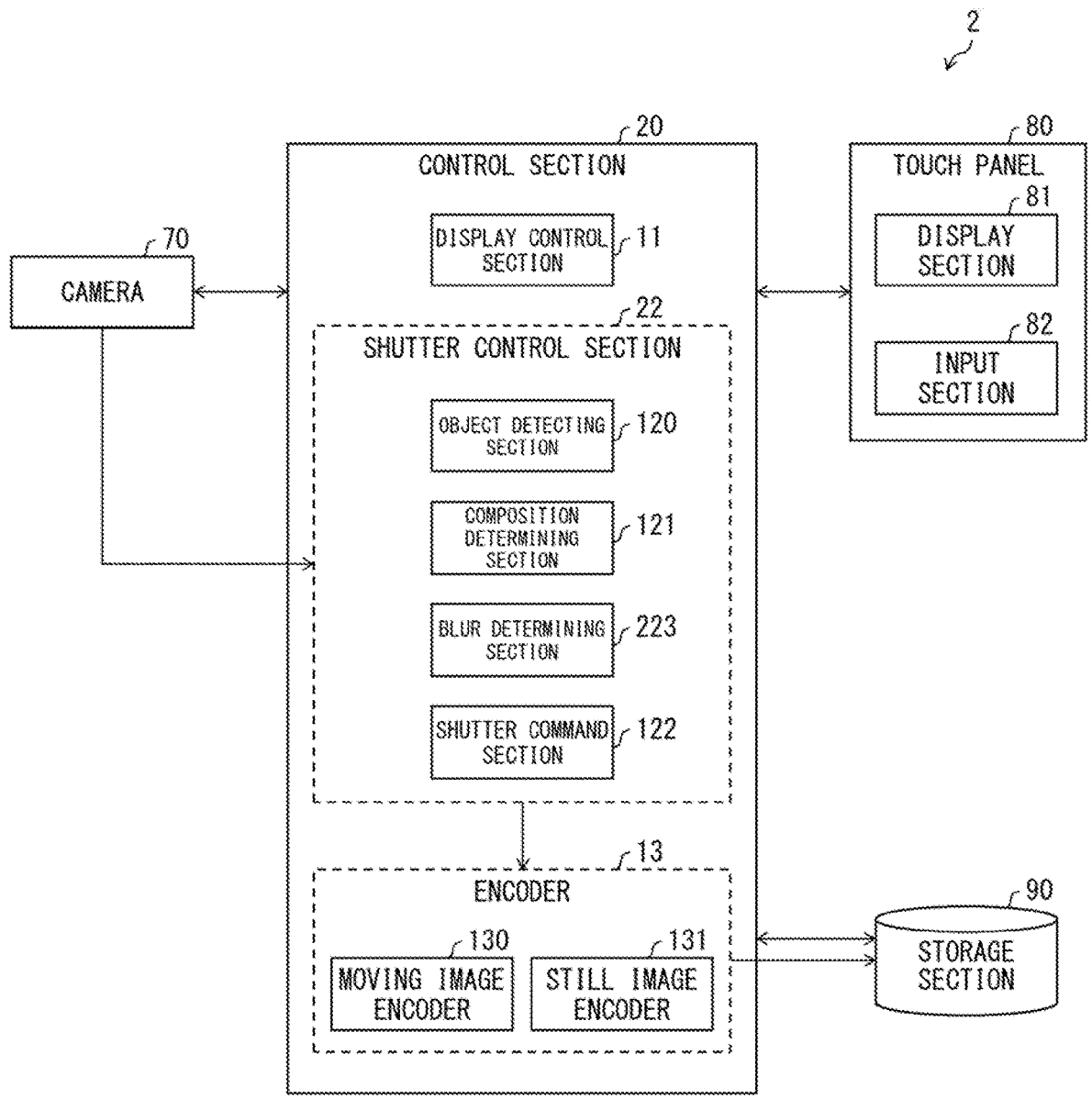
FIG. 7 is a functional block diagram illustrating a main part configuration of a smartphone in accordance with Embodiment 2.

FIG. 7 is a functional block diagram illustrating a main part configuration of a smartphone 2 (image pickup device) in accordance with Embodiment 2. The smartphone 2 includes a control section 20 (control device). The control section 20 includes a shutter control section 22. Unlike the shutter control section 12 in Embodiment 1, the shutter control section 22 includes a blur determining section 223.

The blur determining section 223 determines whether an image of an OBJM is blurring in a still image A, which OBJM is detected by an object detecting section 120. In other words, the blur determining section 223 determines a focusing state of the image of the OBJM in the still image A. A method for determining the focusing state by the blur determining section 223 can be a well-known method.

Figure 8:
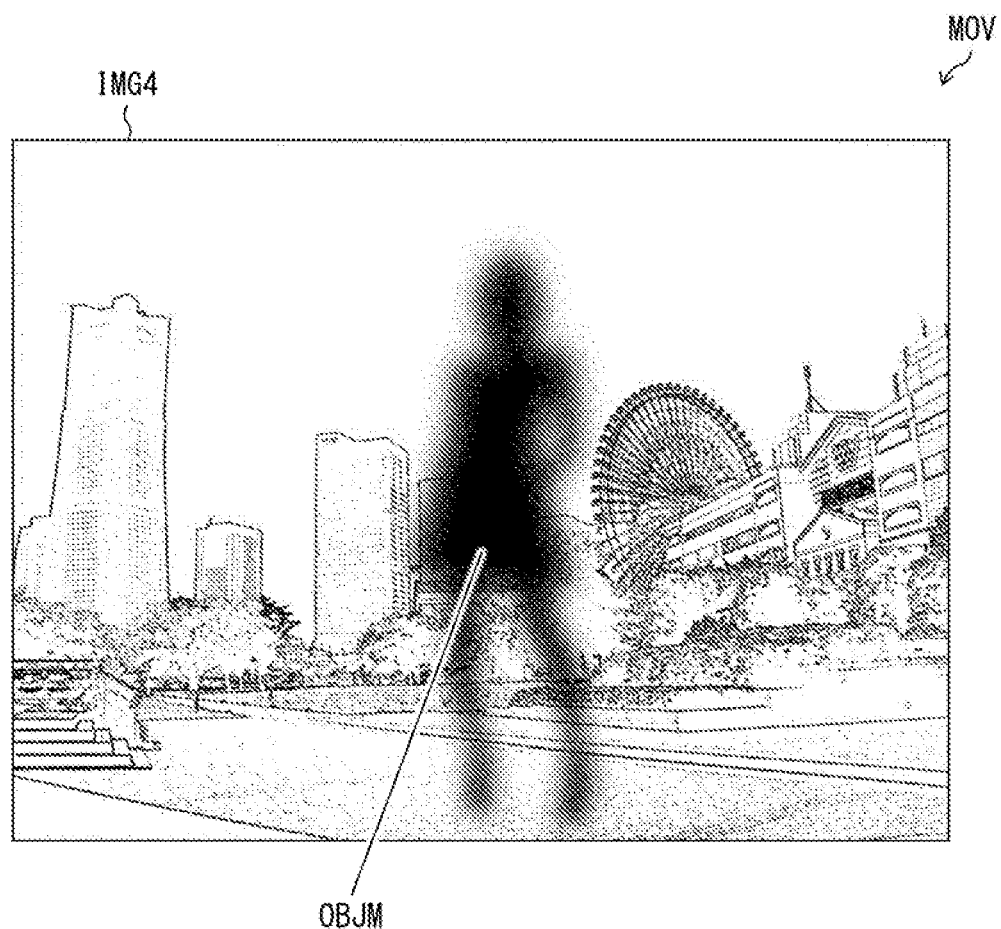
FIG. 8 is a diagram for explaining an operation example of the smartphone illustrated in FIG. 7, in a special mode.

FIG. 8 is a diagram for explaining an operation of the smartphone 2 in a special mode. FIG. 8 shows an IMG4, which is another example of the still image A (target frame). The size and the position of an OBJM in the IMG4 are similar to those of the OBJM in the IMG2. Accordingly, in the IMG4, a main object-based image capture permitting condition is satisfied as in the IMG2. Note however that the image of the OBJM is blurring in the IMG4 unlike in the IMG2.

In Embodiment 2, the shutter command section 122 causes the camera 70 to selectively perform a shutter operation, additionally in accordance with a result of determination by the blur determining section 223. Specifically, the shutter command section 122 does not supply any shutter command signal to the camera 70 in a case where it is determined that the image of the OBJM is blurring. The shutter command section 122 supplies a shutter command signal to the camera 70 in a case where (i) the main object-based image capture permitting condition and a composition-based image capture permitting condition are satisfied and (ii) the image of the OBJM is not blurring.

Figure 9:
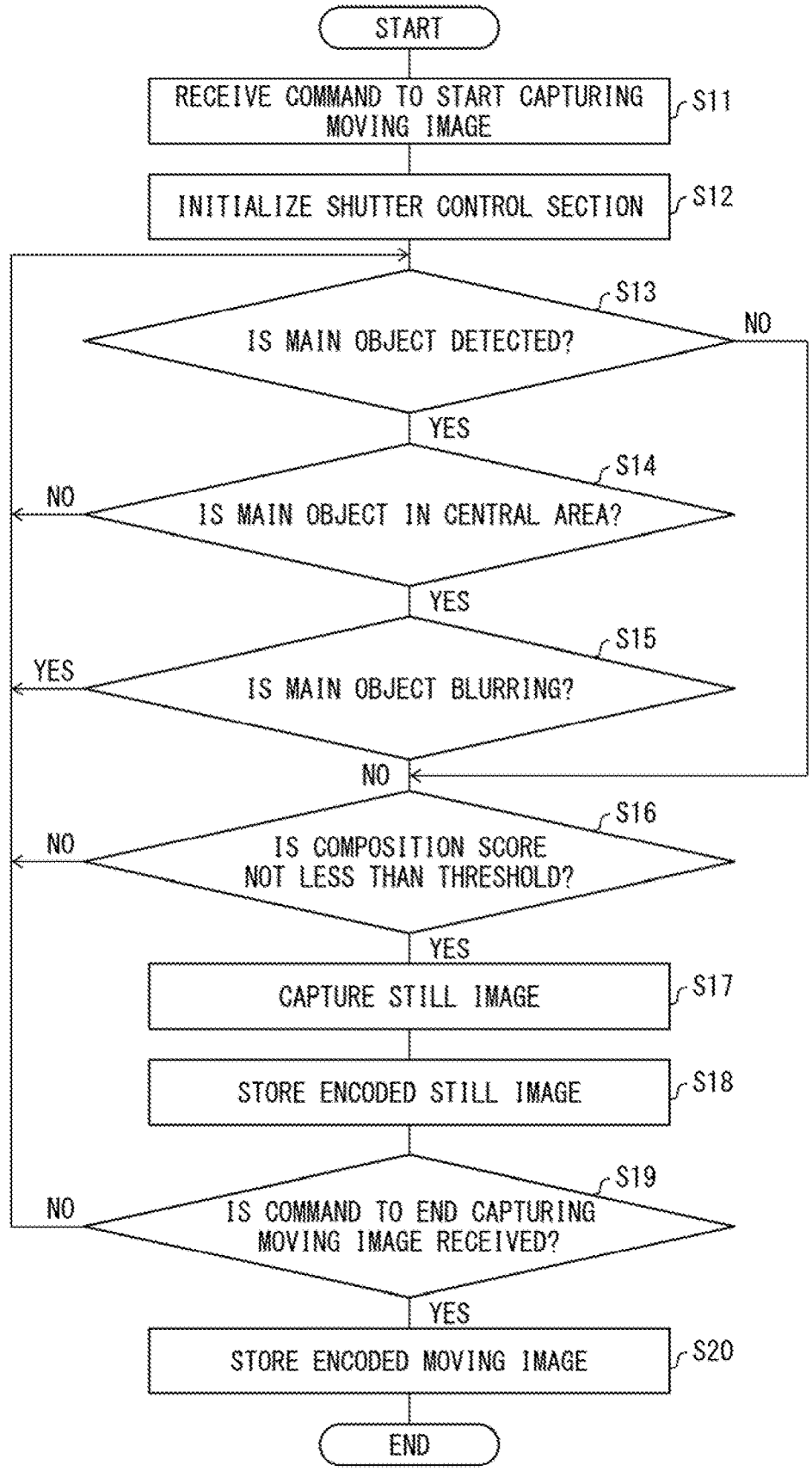
FIG. 9 is a diagram for explaining a flow of a process in the special mode in the smartphone illustrated in FIG. 7.

FIG. 9 is a flowchart showing an example of a flow of a process (S11 to S20) in the special mode in the smartphone 2. Steps S11 to S14 and S16 to S20 are similar to Steps S1 to S4 and S5 to S9, respectively. Therefore, the following description will discuss only Step S15 and steps which are related to Step 15.

Subsequent to 514, the blur determining section 223 determines whether or not an image of an OBJM is blurring in a still image A (S15). In a case where the image of the OBJM is blurring in the still image A (YES in S15), the process returns to 513. In contrast, in a case where the image of the OBJM is not blurring in the still image A (NO in S15), the process proceeds to S16.

(Effects)

Among still images in which an OBJM is emphatically presented, an aesthetic quality of a still image A (e.g., IMG4), in which the image of the OBJM is blurring, is lower than that of another still image A (e.g., IMG2) in which the image of the OBJM is not blurring. This is because the original appearance of the OBJM is not appropriately presented due to the blurring in the IMG4 unlike in the IMG2.

Note however that in a case where an SC is calculated, the value of the SC may not be a value to which influence of the blurring on the aesthetic quality is appropriately reflected. For example, when the composition determining section 121 calculates the SC of the IMG4, the SC obtained as a result is 80. That is, according to evaluation based on the SC, "the aesthetic quality of the IMG4 is equivalent to that of the IMG2". In this case, the smartphone 1 automatically captures the IMG4 as with the IMG2. However, in reality, the aesthetic quality of the IMG4 is lower than that of the IMG2 because of the blurring.

In view of the above, it is preferable to take into consideration the influence of burring in an image of an OBJM in order not to provide a user with a still image A (e.g., IMG4) whose aesthetic quality is not high among still images in which the OBJM is emphatically presented. The smartphone 2 makes it possible to cause the camera 70 to selectively perform the shutter operation, by additionally taking to consideration influence of blurring. This makes it possible to prevent automatic capturing of the IMG4. Consequently, the smartphone 2 automatically captures only the IMG2.

<Variation>

A functional part (e.g., object detecting section 120), as a part of the shutter control section 22, may be provided as a functional part outside the control section 20. For example, the object detecting section 120 may be realized by a digital signal processor (DSP) which is provided outside the control section 20. This is also true for the composition determining section 121, an encoder 13, etc.

[Software Implementation Example]

Control blocks of the smartphone 1, 2 (particularly, the control section 10, 20) can be realized by a logic circuit (hardware) provided in an integrated circuit (IC chip) or the like or can be alternatively realized by software.

In the latter case, the smartphone 1, 2 includes a computer that executes instructions of a program that is software realizing the foregoing functions. This computer includes, for example, at least one processor control device) and at least one computer readable storage medium in which the program is stored. The object of an aspect of the present invention can be achieved by the processor reading and executing the program stored in the storage medium in the computer. Note that the processes can be, for example, a central processing unit (CPU). The storage medium can be "a non-transitory tangible medium" such as a read only memory (ROM), a tape, a disk, a card, a semiconductor memory, or a programmable logic circuit. Further, the storage medium can further include a random access memory (RAM) in which the program is loaded. Furthermore, the program can be supplied to or made available to the computer via any transmission medium (such as a communication network or a broadcast wave) which allows the program to be transmitted. Note that an aspect of the present invention can also be achieved in the form of a computer data signal in which the program is embodied via electronic transmission and which is embedded in a carrier wave.

[Recap]

An image pickup device in accordance with Aspect 1 of the present invention is an image pickup device (smartphone 1) including: an image pickup section (camera 70) capable of capturing a still image (IMG1 to IMG4) and a moving image (MOV), a control device (control section 10) configured to control the image pickup section; and a storage section (90), the control device (i) determining favorability of a composition of a target frame (IMG1 to IMG4) which is an arbitrary frame among a plurality of frames constituting the moving image, and (ii) in accordance with a result of determining the favorability of the composition of the target frame, storing the still image in the storage section, the still image corresponding to the target frame.

The above configuration allows the image pickup device (more specifically, the control device) to comprehensively evaluate (determine) an aesthetic quality (favorability) of an overall composition of a target frame. Then, when an aesthetic quality of an overall composition of a certain frame is positively evaluated, the control device can store, in the storage section, a still image which corresponds to the certain target frame (ideally, a still image which has the same composition as the certain target frame). In other words, the still image can be selectively captured by the image pickup device.

Therefore, it is possible to automatically capture an aesthetically excellent still image without need of user's manual operation (e.g., press on a shutter button). This allows a user to easily arid simply obtain an aesthetically excellent still image.

An image pickup device in accordance with Aspect 2 of the present invention is configured preferably such that in Aspect 1, the image pickup device further includes: a display section (81), the control device storing, in the storage section, the still image corresponding to the target frame in either a period during which a process for storing the moving image in the storage section is being carried out or a period during which a through-lens image corresponding to the moving image is being displayed on the display section.

The configuration makes it possible to improve convenience of users.

An image pickup device in accordance with Aspect 3 of the present invention is configured preferably such that: in Aspect 1 or 2, the control device determines the favorability of the composition of the target frame, on the basis of at least one of the following Criteria 1 to 3 (Criterion 1) at least either hue or brightness in the target frame; (Criterion 2) a degree of blurring in the target frame; and (Criterion 3) a positional relation of respective images of two or more objects contained in the target frame.

The above configuration makes it possible to more appropriately determine the favorability of the composition of the target frame.

An image pickup device in accordance with Aspect 4 of the present invention is configured preferably such that: in any one of Aspects 1 to 3, the control device calculates a composition score which is an index indicative of the favorability of the composition of the target frame, and stores, in the storage section, the still image corresponding to the target frame, by using the composition score as the result of determining the favorability of the composition of the target frame.

The above configuration makes it possible to quantitatively evaluate the favorability of the composition of the target frame, by use of the composition score. Accordingly, the still image can be stored in the storage section in accordance with the composition score (in other words, the still image can be selectively captured). For example, the above configuration allows a user to automatically obtain a still image corresponding to a target frame having a high composition score as an aesthetically excellent still image.

An image pickup device in accordance with Aspect 5 of the present invention is configured preferably such that: in any one of Aspects 1 to 4, a predetermined one of a plurality of objects, which are presented in the moving image, is regarded as a main object (OBJM); arid the control device (i) detects an image of the main object contained in the target frame; and (ii) stores the still image in the storage section, additionally in accordance with a result of detecting the image of the main object in the target frame, the still image corresponding to the target frame.

The above configuration makes it possible to additionally take into consideration a result of detecting an image of a main object when a still image is to be stored in the storage section. This consequently allows a user to obtain a more aesthetically-excellent still image.

An image pickup device in accordance with Aspect 6 of the present invention is configured preferably such that: in Aspect 5, in a case where the image of the main object is detected in the target frame, the control device further detects a position and a size of the image of the main object in the target frame; and at least either (i) in a case where the image of the main object is not in a predetermined area in the target frame or in a case where the size of the image of the main object is smaller than a predetermined size in the target frame, the control device does not store, in the storage section, the still image corresponding to the target frame.

As described above, in a case where the presence of an image of a main object in a target frame is not sufficiently emphasized, the target frame is not good enough as a still image which presents the main object. In light of this, the above configuration makes it possible to prevent such a still image from being stored in the storage section (i.e., prevent automatic capturing of the still image). It is therefore possible to provide a user with an aesthetically excellent still image in which the presence of an image of a main object is sufficiently emphasized.

An image pickup device in accordance with Aspect 7 of the present invention is configured preferably such that: in Aspect 5 or 6, in a case where no image of the main object is detected in the target frame, the control device stores, in the storage section, the still image corresponding to the target frame in a case where the result of determining the favorability of the composition of the target frame is not less than a predetermined level.

The above configuration makes it possible to provide a user with an aesthetically excellent still image even in a case where no image of a main object is contained in a target frame. This makes it possible to provide a user with an aesthetically excellent still image of scenery.

An image pickup device in accordance with Aspect 8 of the present invention is configured preferably such that: in any one of Aspects 5 to 7, in a case where the image of the main object is detected in the target frame, the control device further determines whether the image of the main object is blurring in the target frame; and in a case where the control device determines that the image of the main object is blurring in the target frame, the control device does not store, in the storage section, the still image corresponding to the target frame.

The above configuration makes it possible to further take into consideration influence of blurring in a case where an image of a main object is contained in a target frame. This makes it possible to prevent obtainment of a still image whose aesthetic quality is not high (still image in which the appearance of a main object is not appropriately presented due to blurring) among still images in which the main object is emphatically presented.

An image pickup device in accordance with Aspect 9 of the present invention is configured preferably such that: in any one of Aspects 5 to 8, in a case where the control device detects images of a plurality of main object candidates in the target frame on an assumption that the main object candidates are objects which are same in kind as the main object, the control device selects, as the main object in the target frame, one main object candidate from among the plurality of main object candidates, the one main object candidate being selected on the basis of at least one of a position and a size of each of the images of the plurality of main object candidates in the target frame.

The above configuration makes it possible to automatically select one main object even in a case where a plurality of main object candidates is contained in a target frame. This makes it possible to improve convenience of users.

An image pickup device in accordance with Aspect 10 of the present invention is configured preferably such that in any one of Aspects 1 to 9, the image pickup device further includes: a display section, the control device causing the display section to display an image (e.g., ICN) indicating that the image pickup device is operating in a special mode in which the still image corresponding to the target frame is selectively stored in the storage section, the special mode being an image capture mode of the image pickup device.

The above configuration allows a user to visually recognize that the image pickup device is currently operating in the special mode.

A method for controlling an image pickup device in accordance with Aspect 11 of the present invention is a method for controlling an image pickup device, the image pickup device including an image pickup section capable of capturing a still image and a moving image, and a storage section, the method including the steps of: (i) determining favorability of a composition of a target frame which is an arbitrary frame among a plurality of frames constituting the moving image; and (ii) in accordance with a result of determining the favorability of the composition of the target frame, storing the still image in the storage section, the still image corresponding to the target frame.

The image pickup device in accordance with each aspect of the present invention may be realized by a computer. In this case, the scope of each aspect of the present invention encompasses a control program for the image pickup device which control program realizes the image pickup device by the computer by causing the computer to operate as each section (software element) of the image pickup device, and a computer-readable storage medium in which the control program is stored.

[Restatement of Aspects of the Present Invention]

Aspects of the present invention can be restated in other words as follows:

An image pickup device in accordance with an aspect of the present invention includes: an image pickup section capable of capturing as still image and a moving image; a control device configured to control the image pickup section; and a display section, on the assumption that (I) any of a plurality of frames constituting the moving image is a target frame and (II) a predetermined one of a plurality of objects presented in the moving image is a main object, the image pickup device having, as an image capture mode, a special mode in which the image pickup section is caused to selectively perform a shutter operation so as to capture a still image corresponding to the target frame in either a period during which the moving image is being captured or a period during which a through-lens image corresponding to the moving image is being displayed on the display section, the control device, in the special mode, detecting an image of the main object which is likely to be contained in the target frame and determining the favorability of a composition of the target frame, and the control device causing the image pickup section to perform the shutter operation in accordance with (i) a result of detecting the image of the main object and (ii) a result of determining the favorability of the composition of the target frame.

In the image pickup device in accordance with an aspect of the present invention, the control device determines the favorability of the composition of the target frame, on the basis of at least one of the following Criteria 1 to 3:

(Criterion 1) at least either hue or brightness in the target frame;

(Criterion 2) a degree of blurring in the target frame; and (Criterion 3) a positional relation of respective images of the plurality of objects contained in the target frame.

In the image pickup device in accordance with an aspect of the present invention, in a case where the image of the main object is detected in the target frame, the control device further detects a position and a size of the image of the main object in the target frame; and at least either (i) in a case where the image of the main object is not in a predetermined area in the target frame or in a case where the size of the image of the main object is smaller than a predetermined size in the target frame, the control device does not cause the image pickup section to perform the shutter operation.

In the image pickup device in accordance with an aspect of the present invention, the control device calculates a composition score which is an index indicative of the favorability of the composition of the target frame, and causes the image pickup section to perform the shutter operation, by using the composition score as the result of determining the favorability of the composition of the target frame.

In the image pickup device in accordance with an aspect of the present invention, in a case where no image of the main object is detected in the target frame, the control device causes the image pickup section to perform the shutter operation in a case where the result of determining the favorability of the composition of the target frame is not less than a predetermined level.

The image pickup device in accordance with an aspect of the present invention, in a case where the image of the main object is detected in the target frame, the control device further determines whether the image of the main object is blurring in the target frame; and in a case where the control device determines that the image of the main object is blurring in the target frame, the control device does not cause the image pickup section to perform the shutter operation.

In the image pickup device in accordance with an aspect of the present invention, the control device causes the display section to display an image indicating that the image pickup device is operating in the special mode.

In the image pickup device in accordance with an aspect of the present invention, in a case where the control device detects images of a plurality of main object candidates in the target frame on the assumption that the main object candidates are objects which are same in kind as the main object, the control device selects, as the main object in the target frame, one main object candidate from among the plurality of main object candidates, the one main object candidate being selected on the basis of at least one of a position and a size of each of the images of the plurality of main object candidates in the target frame.

A method for controlling an image pickup device in accordance with an aspect of the present invention is a method for controlling an image pickup device, the image pickup device including: an image pickup section capable of capturing a still image and a moving image; a control device configured to control the image pickup section; and a display section, on the assumption that (I) any of a plurality of frames constituting the moving image is a target frame and (II) a predetermined one of a plurality of objects presented in the moving image is a main object, the image pickup device having, as an image capture mode, a special mode in which the image pickup section is caused to selectively perform a shutter operation so as to capture a still image corresponding to the target frame in either a period during which the moving image is being captured or a period during which a through-lens image corresponding to the moving image is being displayed on the display section, the method including, in the special mode, the steps of: (a) detecting an image of the main object which is likely to be contained in the target frame; (b) determining the favorability of a composition of the target frame; and (c) causing the image pickup section to perform the shutter operation in accordance with (i) a result of detecting the image of the main object and (ii) a result of determining the favorability of the composition of the target frame.

[Supplemental Remarks]

An aspect of the present invention is not limited to the above embodiments, but can be altered within the scope of claims by a skilled person in the art. The present invention also encompass, in the technical scope, any embodiment derived by combining technical means disclosed in differing embodiments. Further, a new technical feature can be formed by combining technical means disclosed in the embodiments.

REFERENCE SIGNS LIST 1, smartphone (image pickup device)
10, 20 control section (control device)
11 display control section
12, 22 shutter control section
70 camera (image pickup section)
80 touch panel
81 display section.
82 input section
90 storage section
120 object detecting section
121 composition determining section
122 shutter command section 223 blur determining section
MOV moving image
IMG1 to IMG4 image (target frame, still image)
ICN icon (image indicating that image pickup device is operating in special mode)
OBJM main object

The invention claimed is:

1. An image pickup device comprising:
an image pickup section capable of capturing a still image and a moving image;
a control device configured to control the image pickup section; and
a storage section,
the control device (i) calculating, on the basis of a positional relation of respective images of two or more objects contained in a target frame, a composition score which is an index indicative of favorability of a composition of the target frame which is an arbitrary frame among a plurality of frames constituting the moving image, and (ii) in a case where the composition score is not less than a predetermined score threshold, automatically storing the still image in the storage section, the still image corresponding to the target frame.

2. The image pickup device as set forth in claim 1, further comprising:
a display section,
the control device automatically storing, in the storage section, the still image corresponding to the target frame in either (i) a period during which a process for storing the moving image in the storage section is being carried out or (ii) a period during which a through-lens image corresponding to the moving image is being displayed on the display section.

3. The image pickup device as set forth in claim 1, wherein:
the control device calculates the composition score, additionally on the basis of at least one of the following (a) and (b):
(a) at least either hue or brightness in the target frame; and
(b) a degree of blurring in the target frame.

4. The image pickup device as set forth in claim 1, wherein:
a predetermined one of a plurality of objects, which are presented in the moving image, is regarded as a main object; and
the control device (i) detects an image of the main object contained in the target frame; and (ii) automatically stores the still image in the storage section, additionally in accordance with a result of detecting the image of the main object in the target frame, the still image corresponding to the target frame.

5. The image pickup device as set forth in claim 4, wherein:
in a case where the image of the main object is detected in the target frame, the control device further detects a position and a size of the image of the main object in the target frame; and
at least either (i) in a case where the image of the main object is not in a predetermined area in the target frame or (ii) in a case where the size of the image of the main object is smaller than a predetermined size in the target frame, the control device does not automatically store, in the storage section, the still image corresponding to the target frame.

6. The image pickup device as set forth in claim 4, wherein:
in a case where no image of the main object is detected in the target frame,
the control device automatically stores, in the storage section, the still image corresponding to the target frame in a case where the composition score is not less than the predetermined score threshold.

7. The image pickup device as set forth in claim 4, wherein:
in a case where the image of the main object is detected in the target frame, the control device further determines whether the image of the main object is blurring in the target frame; and
in a case where the control device determines that the image of the main object is blurring in the target frame, the control device does not automatically store, in the storage section, the still image corresponding to the target frame.

8. The image pickup device as set forth in claim 4, wherein:
in a case where the control device detects images of a plurality of main object candidates in the target frame on an assumption that the main object candidates are objects which are same in kind as the main object,
the control device selects, as the main object in the target frame, one main object candidate from among the plurality of main object candidates, the one main object candidate being selected on the basis of at least one of a position and a size of each of the images of the plurality of main object candidates in the target frame.

9. The image pickup device as set forth in claim 1, further comprising:
a display section,
the control device causing the display section to display an image indicating that the image pickup device is operating in a special mode in which the still image corresponding to the target frame is selectively stored in the storage section, the special mode being an image capture mode of the image pickup device.

10. A method for controlling an image pickup device,
the image pickup device including an image pickup section capable of capturing a still image and a moving image, and a storage section,
the method comprising the steps of:
(i) calculating, on the basis of a positional relation of respective images of two or more objects contained in a target frame, a composition score which is an index indicative of favorability of a composition of the target frame which is an arbitrary frame among a plurality of frames constituting the moving image; and
(ii) in a case where the composition score is not less than a predetermined score threshold, automatically, storing the still image in the storage section, the still image corresponding to the target frame.

* * * * *